United States Patent [19]

Sanner

[11] Patent Number: 4,872,172
[45] Date of Patent: Oct. 3, 1989

[54] PARITY REGENERATION SELF-CHECKING

[75] Inventor: Martin W. Sanner, San Jose, Calif.

[73] Assignee: Tandem Computers Incorporated, Cupertino, Calif.

[21] Appl. No.: 126,806

[22] Filed: Nov. 30, 1987

[51] Int. Cl.$^4$ .............................................. G06F 11/10
[52] U.S. Cl. ................................... 371/49.1; 371/25.1
[58] Field of Search ................... 371/9, 15, 16, 48, 49; 364/738, 900 MS File

[56] References Cited

U.S. PATENT DOCUMENTS 4,360,891 11/1982 Branigin et al. ..................... 364/900
4,412,281 10/1983 Works ..................................... 371/9

FOREIGN PATENT DOCUMENTS 124947 9/1979 Japan ..................................... 364/738

Primary Examiner—Jerry Smith
Assistant Examiner—Stephen M. Baker
Attorney, Agent, or Firm—Townsend & Townsend

[57] ABSTRACT

A parity regeneration and self-check technique is used for detecting and locating errors in data communicated to, through, and from a digital subsystem. The invention utilizes a parity check associated with a data input of the subsystem, regenerating parity for data communicated from an output of the subsystem, checking the regenerated parity and comparing that check with other checks.

13 Claims, 1 Drawing Sheet

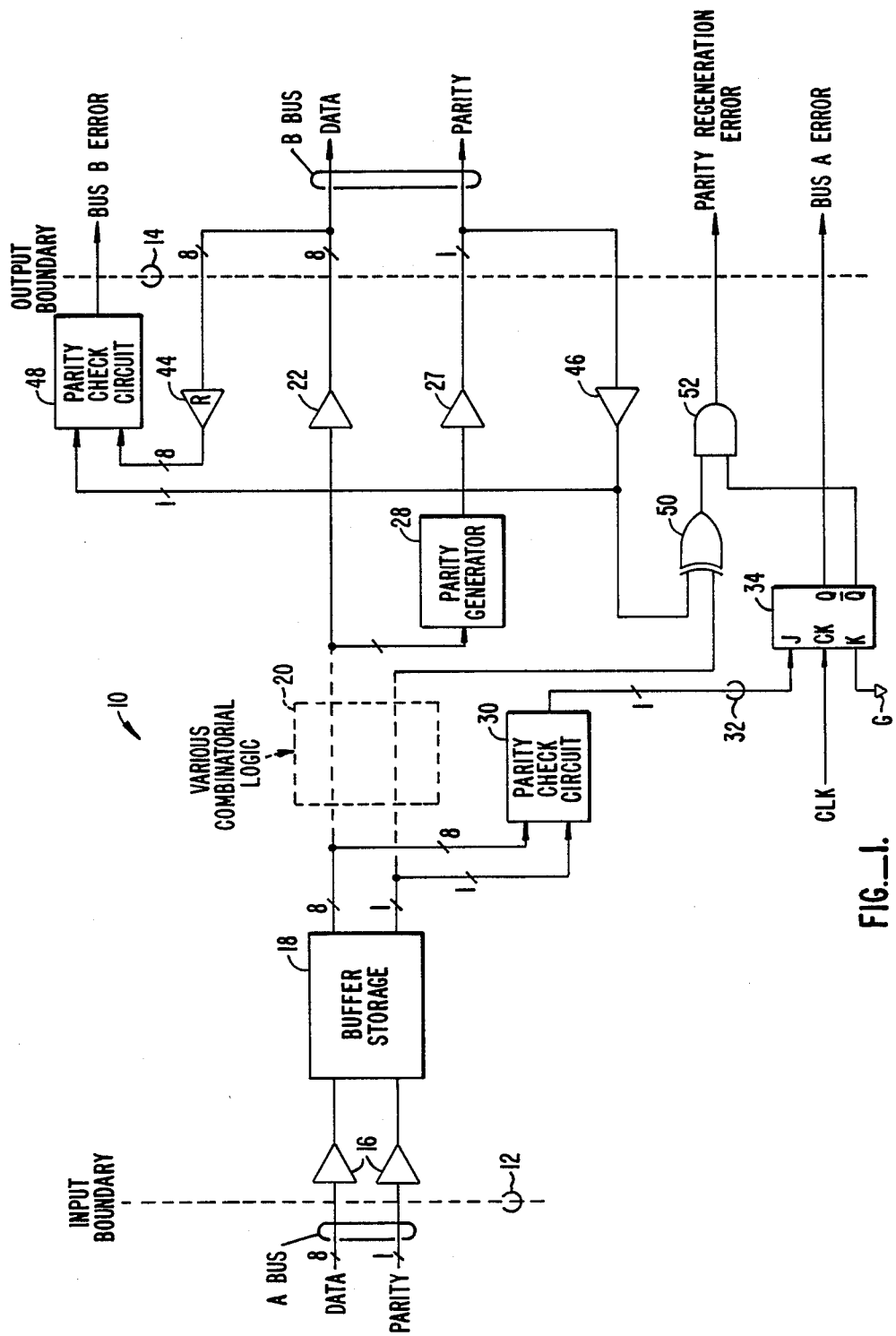
FIG._1.

PARITY REGENERATION SELF-CHECKING

BACKGROUND OF THE INVENTION

The present invention relates generally to digital systems, and more particularly to error detection and isolation.

The need for error detection arises from that well-known and oft-stated adage: If anything can be wrong, it will. Today's computing equipment continuously transfers data between a central processing unit (CPU) and associated peripherals, storage, terminals, and other like elements. Errors can be introduced during the reading, writing, or actual transmission of the data. Accordingly, error control has become a necessary part of the design of modern digital systems.

A variety of error-detection methods are in use today. Typically, these methods involve the addition of one or more bits, called "redundancy bits," to the information-carrying bits of a character or stream of characters. These redundancy bits do not carry any information; rather they are used to determine the corectness of the bits carrying the information.

Perhaps the most commonly used method of error detection is the simple parity check. A parity check consists of adding up the bitts in a unit of data, calculating the parity bit required, and checking the calculated parity bit with that transferred with the data item.

Carrying the redundancy bit (e.g., the parity bit) with the information is important for data integrity. However, if the data is corrupted at one point, it is obviously not desirable to pass that corrupted data to another point because its effect becomes more negative.

In many digital systems, data can cross a number of "boundaries" of such subsystems as circuit boards or chips. Good design will or should invoke checking the data integrity when such a boundary is crossed as an input; and crossing a boundary as an output usually results in the parity being regenerated. The problem with this, however, is that in the event data is corrupted between the two boundaries the regenerated parity will be good for that data, but the data will be bad.

Thus, it is better to carry parity with the data wherever it goes. However, the problem here is when the parity error is ultimately detected, there is no way of isolating where that error occurred (i.e., prior to or at the input boundary, between the two boundaries, or at or after the output boundary).

SUMMARY OF THE INVENTION

The present invention provides the advantages of both parity regeneration and communicating data and parity together throughout, to provide a fault isolation of where data may have been corrupted.

According to the present invention, in a digital system formed by a number of subsystems, each of the subsystems having boundaries across which data and parity pass, there is a first parity check associated with the data input across a boundary, a parity regeneration associated with the data output across a boundary, a parity check associated with the regenerated parity and data communicated from the output boundary, and a comparison of the regenerated parity with the parity associated with data received at the input boundary. A mixmatch or parity error produces error signals from which can be determined approximately where, relative to the subsystem, the data corruption occurred: At the input to the subsystem, in the subsystem itself, or at the output (boundary).

A number of advantages flow from the present invention. Perhaps foremost among these advantages is the fact that the invention operates to check data in a way that permits parity regeneration, yet checks to ensure that data leaving a subsystem matches that entered the subsystem. If there is a mismatch, an error signal flags that mismatch.

In addition, the checking and error signalling is such that the fault can be isolated, relative to the subsystem, to (1) the input boundary, (2) within the subsystem itself, or (3) across the output boundary.

These are only a few of the advantages achieved by the present invention. A more complete appreciation of the other features, and additional advantages, of the invention will be obtained from a reading of the following detailed description of the invention and the accompanying drawings.

BRIEF DESCRIPTION OF THE DRAWING

FIG. 1 is a block diagram of the invention, illustrating its use to monitoro the integrity of data communicated across an input boundary of a digital subsystem, through various combinatorial logic contained within the boundary of that subsystem, and to an output of the subsystem.

DETAILED DESCRIPTION OF THE INVENTION

As noted above in many of the modern computing systems in use today, data is transferred across many boundaries defined by subsystems in the form of circuit boards, integrated circuit chips, and like units that make up the computing system. These subsystems can be a part, or all, of the central processing unit, for example, or a peripheral device, an input/output (I/O) structure that may include a channel, an I/O bus, or a peripheral controller.

The present invention is structured to maintain an integrity check of the data communicated across the boundaries of these subsystems, be they board or chip, and to provide a form of fault isolation when corruption is detected.

Turning now to FIG. 1, there is illustrated a subsystem, designated generally with the reference numeral 10, having input and output boundaries, 12 and 14, across which data and parity are transferred. As FIG. 1 shows, the subsystem 10 receives, at teh input boundary 12, an A bus that carries a multi-bit data word comprising eight bits of informational data and one bit of parity. Line receivers 16 conduct the received multi-bit data words to a buffer storage 18 where they are temporarily held before the eight bits of data is communicated therefrom through various combinatorial logic 20 to a line dimers 22, and output terminal 24, to a B bus.

It should be appreciated and understood that, except for the parity checking and regeneration circuits associated with the present invention, as will be identified and described more fully below, the description of the subsystem 10 and its content is illustrative only; that is, it may well be that the exact implementation of the subsystem 10 may not have line receivers, or line drivers, or a buffer storage. It is assumed, however, that the subsystem will containn one or more of these elements, together with some form of combinatorial logic (designated generally with the reference numeral 20 in FIG. 1). However, it is more probable than not that a subsystem will have at least some form of storage (in addition to the combinatorial logic 20), temporary or otherwise, so that the subsystem represented by FIG. 1 may not be too far from the configuration of a typical subsystem.

Continuing with FIG. 1, each multi-bit word, (data and parity) accessed from the buffer storage 18 is, on its way to the combinatorial logic 20, applied to parity check circuit 30. If the parity accompanying the data is incorrect, the parity check circuit will generate a parity error that is communicated on signal line 32 to a J input of a J/K flip-flop 34. Note that the K input of the J/K flip-flop 34 is connected to ground (G) so that the parity error owill be latched by the CLK signal (an internal clock), producing a BUS A ERROR signal. Since the K input of the J/K flip-flop 34 is connected to ground (G), the flip-flop 34 remains in its set state to keepp the BUS A ERROR signal HIGH.

The eight bits of data pass through the combinatorial logic 20 and are applied to a parity generator 28, which generates one bit of parity that is communicated to a line driver 27 and across the output boundary 14 to the B bus. A line driver 22 communicates the data bits across the output boundary 14 to the B bus.

As FIG. 1 further indicates, the data and parity carried by the B bus are communicated back across the output boundary 14 of the subsystem 10 to line receivers 44 and 46, respectively, and applied to a parity check circuit 48, which generates a BUS B ERROR signal when a parity error is detected.

From the line receiver 46, the B bus parity bit is coupled to an input of the EXCLUSIVE-OR gate 50, which also receives via the combinatorial logic 20 the original parity bit of the multi-bit word accessed from the buffer storage 18. The output of the EXCLUSIVE-OR gate 50 is applied to one input or an AND gate 52. The other input of the AND gate 52 receives the $\overline{Q}$ output of the J-K flip-flop 34.

As has been seen, there are three general points within the subsystem 10 at which the integrity of the data is checked: (1) At the parity check circuit 30, (2) at the parity check circuit 48, and (3) at the EXCLUSIVE-OR and AND gates 50 and 52. These checks provide three error signals: BUS A ERROR, PARITY REGENERATION ERROR, and BUS B ERROR, respectively, which in turn give an indication of where the error may have occurred.

Thus, for exaple, if data is corrupted by noise or other influences at the buffer storage 18 or upstream therefrom (i.e., on the A bus) the parity check circuit 30 will detect such error to force assertion of the BUS A ERROR signal. Generation of the BUS A ERROR signal causes the $\overline{Q}$ output of the J/K flip-flop 34 to go LOW to inhibit generation of the PARITY REGENERATION ERROR by disabling the AND gate 52. Assertion of the BUS A ERROR signal provides one with information tending to isolate the error to the buffer storage or upstream therefrom.

Conversely, assume that the eight bits of data is corrupted by the combinatorial logic 20. The parity generated by the parity generator 28 (and communicated on the B bus) will match the corresponding eight bits of data (assuming no corruption on the B bus itself). However, since the regenerated parity is coupled back through the line receiver 46 to the EXCLUSIVE OR gate 50 and compared thereat with the original parity, a miscompare will result, generating the PARITY REGENERATION ERROR, and indicatingn that the corruption of data has occurred on the subsystem 10, but downstream of the buffer storage 18 (or, perhaps more accurately, downstream of the connection to parity check circuit 30).

However, assuming now that data is not corrupted on the A bus, or by the buffer storage 18 or combinatorial logic 20, but that the line drivers 22, 27, the B bus, or any of the connections between, have malfunctioned in some way to corrupt the multi-bit data word. The parity check circuit 48 will issue the BUS B ERROR signal.

Thus, there has been disclosed a technique for checking and isolating occurrence of parity errors on a subsystem that communicates a multi-bit data word, comprising N bits of information and M bits of checking code at three general points: One, associated with the input boundary of the subsystem, a second associated with determining whether corruption occurs within any combinatorial logic contained by the subsystem, and a third operable to determine whether corruption occurs downstream of the input boundary of the subsystem.

I claim:

1. In a digital system of the type having storage means for temporarily storing multi-bit data words received by the digital system, output means coupled to an output bus for applying multi-bit data words thereat, and combinatorial logic means for receiving the multi-bit data words from the storage means, the multi-bit data words having N bits of data and M bitts of checking code, apparatus for checking the integrity of the multi-bit data words and to isolate points of data word corruption, the apparatus comprising:

first circuit means coupled to the buffer means for checking the multi-bit data words communicated therefrom, using the M bits of checking code, to produce therefrom a first error signal indicative of data word corruption occurring upstream of the first circuit means;

code generating means for receiving the N bits of data of the multi-bit data words from the combinatorial logic means to produce therefrom M bits of regenerated checking code that is communicated to the output means;

second circuit means coupled to the output bus for checking the multi-bit data words communicated therefrom, using the M bits of regenerated checking code, to produce therefrom a second error signal indicative of data word corruption occurring between the combinatorial logic means and the output bus; and third circuit means coupled to receive the first error signal, and to receive and compare the M bits of checking code from the combinatorial logic means and the M bits of regenerated checkingn code from the output bus to produce therefrom, in absence of the first error signal, a third error signal indicative of data word corruption occurring between buffer means and the output means.

2. The digital system of claim 1, wherein M=1.

3. The digital system of claim 1, wherein the first and the second circuit means are each operable to perform parity checks on the multi-bit data words received by each.

4. The digital system of claim 2, wherein M=1.

5. The digital system of claim 1, including latch means coupled to the first circuit means for temporarily storing the first error signal.

6. The digital system of claim 1, wherein the M bits of checking code and the M bits of regenerated checking code are parity bits.

7. In a digital system of the type having storage means for temporarily storing multi-bit data words received by the digital system, output means coupled to an output bus for applying multi-bit data words thereat, and combinatorial logic means for receiving the multi-bit data words from the storage means, the multi-bit data words having N bits of data and M bits of checking code, apparatus for checking the integrity of the multi-bit data words and to isolate points of data word corruption, the apparatus comprising:

first circuit means coupled to the buffer means for checking the multi-bit data words communicated therefrom, using the M bits of ochecking code, to produce therefrom a first error signal indicative of data word corruption occurring upstream of the first circuit means;

latch means coupled to the first circuit means for temporarily storing the first error signal;

code generating means for receiving the N bits of data of the multi-bit data words from the combinatorial logic means to produce therefrom M bits of regenerated checking code that is communicated to the output means;

second circuit means coupled to the output bus for checking the multi-bit data words communicated therefrom, using the M bits of regenerated checking code, to produce therefrom a second erroro signal indicative of data word corruption occurring between the combinatorial logic means and the output bus; and third circuit means coupled to the latch means to receive the temporarily stored first error signal for receiving and comparing the M bits of checking code and the M bits of regenerated checking code to produce therefrom, in absence of the temporarily stored first error signal, a third error signal indicative of data word corruption occurring between the buffer means and the output means.

8. The digital system of claim 7, wherein the first and the second circuit means are each operable to perform parity checks on the multi-bit data words received by each.

9. The digital system of claim 7, wherein $M=1$.

10. The digital system of claim 9, wherein the first and the second circuit means are each operable to perform parity checks on the multi-bit data words received by each.

11. The digital system of claim 7, wherein the M bits of checking code and the M bits of regenerated checking code are parity bits.

12. A digital system according to claim 6 or 11, in which $M=1$.

13. A digital system as in any one of claims 3-1, 5, 7-8, or 10, in which $M=1$.

* * * * *